July 14, 1959

W. C. LANNING 2,894,824

POLYMERIZATION APPARATUS

Filed Feb. 11, 1955

INVENTOR.
W.C. LANNING

BY
Hudson and Young
ATTORNEYS

July 14, 1959 W. C. LANNING 2,894,824
POLYMERIZATION APPARATUS
Filed Feb. 11, 1955 3 Sheets-Sheet 2

INVENTOR.
W. C. LANNING
BY
Hudson and Young
ATTORNEYS

July 14, 1959

W. C. LANNING 2,894,824

POLYMERIZATION APPARATUS

Filed Feb. 11, 1955

INVENTOR.
W. C. LANNING

BY
Hudson and Young
ATTORNEYS

United States Patent Office 2,894,824
Patented July 14, 1959

2,894,824

POLYMERIZATION APPARATUS

William C. Lanning, Bartlesville, Okla., assignor to Phillips Petroleum Company, a corporation of Delaware Application February 11, 1955, Serial No. 487,515

6 Claims. (Cl. 23—285)

This invention relates to olefin polymerization. In one aspect, it relates to the production of normally solid polymers. In another aspect, it relates to a process for producing a polymer having increased molecular weight. In another aspect, it relates to a polymerization process having a reduced reactor capacity requirement. In another aspect, it relates to improving heat transfer in a polymerization reaction. In another aspect, it relates to an apparatus for conducting a polymerization reaction.

It has recently been found that tacky, semisolid, and solid polymers can be produced by polymerizing olefinic hydrocarbons at only moderately elevated temperatures and pressures in the presence of solid catalysts. The copending application of Hogan and Banks, Serial No. 573,877, filed March 26, 1956, now Patent 2,825,721, said Serial No. 573,877 being a continuation-in-part of Serial No. 476,306, filed December 20, 1954, now abandoned, which is a continuation-in-part of Serial No. 333,576, filed January 27, 1953, now abandoned, describes such a process which includes contacting an aliphatic 1-olefin having a maximum chain length of 8 carbon atoms and no branching nearer the double bond than the 4-position with a catalyst comprising chromium oxide, including a substantial proportion of hexavalent chromium, associated with at least one other oxide, especially silica, alumina, zirconia, and/or thoria. The reaction can be conducted at temperatures in the range 150 to 450° F. and pressures ranging from atmospheric to 1000 p.s.i. or higher. However, only moderate pressures are necessary and, usually, only sufficient pressure to maintain liquid-phase reaction conditions is used. The reaction is often conducted with the reactant olefin in admixture with a solvent hydrocarbon which is liquid and inert under the polymerization conditions. As more fully discussed in the cited Hogan and Banks applications such hydrocarbons include paraffins and naphthenes, having from 3 to 12, preferably 5 to 12, carbon atoms per molecule. Thus, the product polymer is obtained in admixture with the solvent.

Polymer-solvent mixtures of the type above described are viscous, pasty, and plastic when the polymer concentration exceeds 5 weight percent. Thus, isooctane solutions of a polyethylene obtained by the process of Hogan and Banks having the following viscosities, at 275° F.:

| Concentration, wt. percent: | Viscosity, centipoises |
|---|---|
| 2 | 3–5 |
| 10 | 30,000–40,000 |
| 13–14 | 200,000 |
| 20 | Too viscous to measure |

This characteristic causes reactor plugging and difficulties in mixing and in heat transfer, polymerization being an exothermic reaction. However, it would be very desirable, for a number of reasons, to maintain a high polymer concentration in the reaction zone. This type of operation would facilitate obtaining high molecular weight polymers. Also, it would allow the use of minimum-capacity reactors, since it would not be necessary to use a highly diluted feed mixture.

This invention provides a polymerization process wherein the foregoing advantages are attained without the described disadvantages.

According to this invention, an olefin is converted to normally solid polymer by the use of a solid catalyst, the polymer concentration is maintained sufficiently high that the reaction mixture is highly viscous, plastic or pasty, and said mixture is forced through the reaction zone. The viscosity of the reactor contents is preferably at least 30,000, and more preferably at least 200,000, centipoises at reaction temperature. Product polymer having a high molecular weight is recovered from the effluent.

Further according to this invention, there is provided a novel apparatus for conducting olefin polymerization and product recovery, said apparatus comprising a reaction chamber, means for forcing a plastic or pasty mixture through said chamber, polymer dissolution means in communication with said reaction chamber, a coolant chamber in indirect heat exchange relation with said reaction chamber, and conduit means connecting the interior of said coolant chamber with said dissolution means.

The terms "pasty" and "plastic" are used herein to correspond to the definition in Perry's "Chemical Engineer's Handbook," third edition, page 1220 (McGraw-Hill Book Co., Inc., New York), i.e., a viscosity of from 200,000 to several million centipoises.

According to one modification of this invention, the plastic reaction mixture is subjected to a kneading action while being forced through the reaction zone. This improves mixing and contacting, as well as heat distribution, during the reaction.

These and other modifications of the invention are illustrated in the accompanying drawings.

Figure 1:
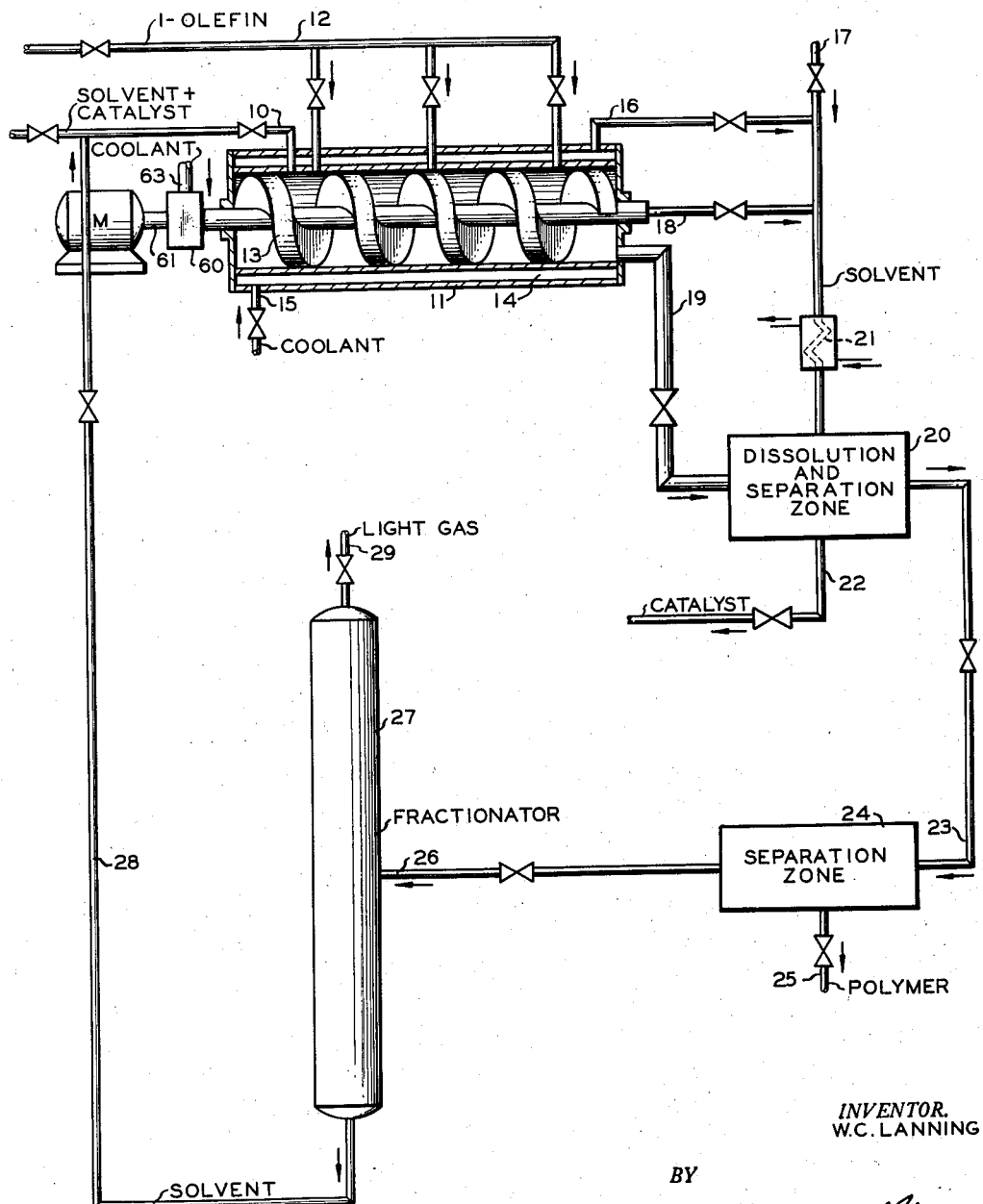
Figure 1 is an elevational flow diagram, partly in section, illustrating one embodiment of this invention.

According to Figure 1, a slurry of catalyst in solvent is pumped through inlet 10 into reactor 11. Reactant olefin of the type previously described passes through manifold inlet 12 into the interior of reactor 11. The catalyst is ordinarily chromium oxide associated with at least one oxide selected from the group consisting of silica, alumina, zirconia, and thoria. The solvent can be cyclohexane. The reactant olefin is ordinarily ethylene, but propylene, 1-butene, and 1-pentene, as well as mixtures of two or more of these olefins can be used. Other olefins of the class described, as well as certain diolefins, can also be used, as more fully discussed in the cited applications of Hogan and Banks.

Reactor 11 is ordinarily of flanged or welded metal construction and capable of withstanding internal pressures of the order of several hundred pounds. It is equipped with hollow helical conveyor 13 and cooling jacket 14, which is provided with coolant inlet 15 and outlet 16. Conveyor 13 is driven by a suitable motor M.

Coolant is circulated through jacket 14 and through the interior of hollow conveyor 13, being introduced into the latter through a device subsequently described in connection with Figure 7.

The interior of reactor 11 is maintained under conditions suitable for the polymerization of the feed olefin to solid and/or semi-solid polymer. When a chromium oxide catalyst is used, the temperature is ordinarily in the range 150 to 450° F., and the pressure is ordinarily in the range 100 to 700 p.s.i. Feed streams can be preheated to the desired temperature in means not shown.

The flow rates of olefin and solvent-catalyst slurry are ordinarily adjusted so that the concentration of polymer is from 10 to 50 weight percent based on polymer plus solvent. Olefin can be added through any or all of the branches of manifold 12.

The coolant circulated through conveyor 13 and jacket 14 is preferably a solvent of the class previously defined herein and is suitably identical with that added through inlet 10 and drawn from the same source, not shown.

The reaction mixture, preferably after venting or flashing, in means not shown in the drawing, to remove any unreacted ethylene, is passed through conduit 19 to dissolution and separation zone 20, which ordinarily comprises a dissolution tank followed by a solids removal means such as a filter, a centrifuge, or a settler. Heated solvent from jacket 14 passes through conduit 16, is mixed with additional solvent, when needed, from a source not shown, and with solvent from conduit 18 and conveyor 13. The entire solvent is heated in indirect heat exchanger 21 and passed to dissolution and separation zone 20. In zone 20, the product polymer is heated and dissolved in the solvent, and the suspended catalyst is separated and withdrawn through outlet 22. The separated catalyst can be recycled by means not shown, or regenerated, in means not shown, prior to recycle, or can be discarded.

The solution of polymer in solvent is passed through conduit 23 to separation zone 24, which can comprise fractional distillation apparatus, flashing equipment or cooling and filtration apparatus for separation of polymer from solvent. Product polymer is recovered through outlet 25.

Solvent is withdrawn through conduit 26, after being separated from product polymer by vaporization or by cooling to precipitate solid polymer and subsequently filtering, and is passed to fractionator 27.

In fractionator 27, any unreacted olefin can be removed as a light gas fraction through conduit 29. It can be recycled, by means not shown, to reactor 11, if desired. Solvent is recycled through conduit 28. Part or all of the solvent recovered in fractionator 27 can be redistilled, in means not shown, to remove any polymer or other relatively high-boiling material remaining in admixture with the solvent. Also, if desired, all of the solvent entering the system can be initially passed through fractionator 27 for removal of light impurities which deleteriously affect the catalyst.

Figure 2:
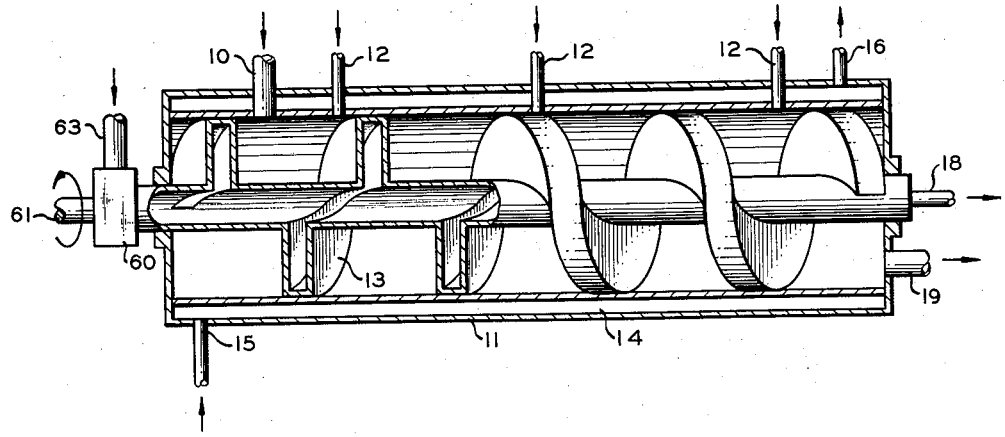
Figure 2 is an elevational diagram, partly in section, illustrating details of the reactor shown in Figure 1.

Figure 2 illustrates the hollow structure of both the axle and helix of conveyor 13, which structure permits circulation of coolant-solvent through the interior of the conveyor. In an alternative structure, not shown, the axle or shaft, except for a short hollow upstream portion thereof, is solid and the helix is hollow or has a conduit therethrough, so that the coolant passing through the interior of the conveyor is forced along a helical route.

Figure 3:
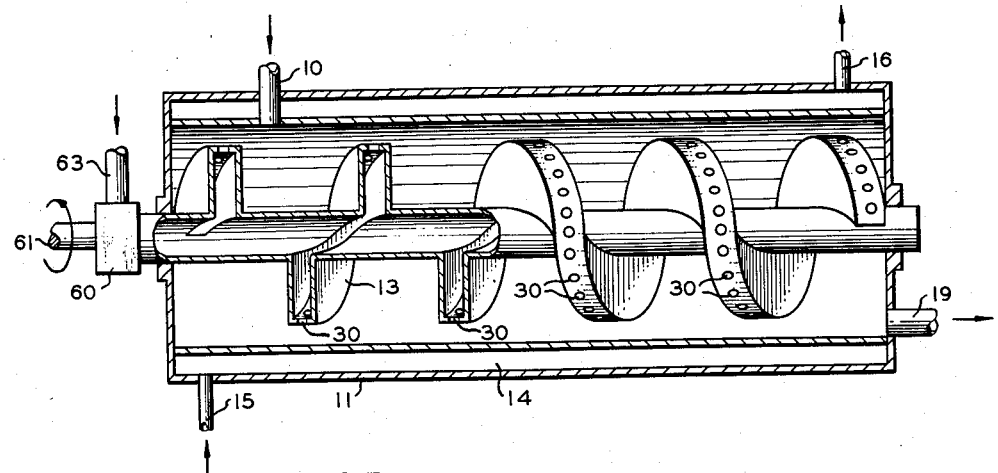
Figure 3 is an elevational diagram, partly in section, showing a modification of the reactor of Figure 2.

Figure 3 illustrates a modification of the reactor of Figure 2. In Figure 3, openings 30 are provided in hollow conveyor 13 to allow passage of part of the solvent-coolant directly into the reaction mixture. Any desired number of openings 30 can be provided. They can be evenly spaced, as shown, or can be greater in number at any desired part of the helix, or they can be positioned at only one end thereof, for example, in the last one or two turns in the downstream end of the helix in order to compensate for any viscosity gradient. They can be used together with, or to the exclusion of, inlet 10, but are preferably used together with inlet 10, since it is ordinarily more convenient to supply catalyst slurry through inlet 10. Openings 30 are preferably quite small, so that the volume of solvent passing through them is relatively small in comparison to that added through inlet 10.

Figure 4:
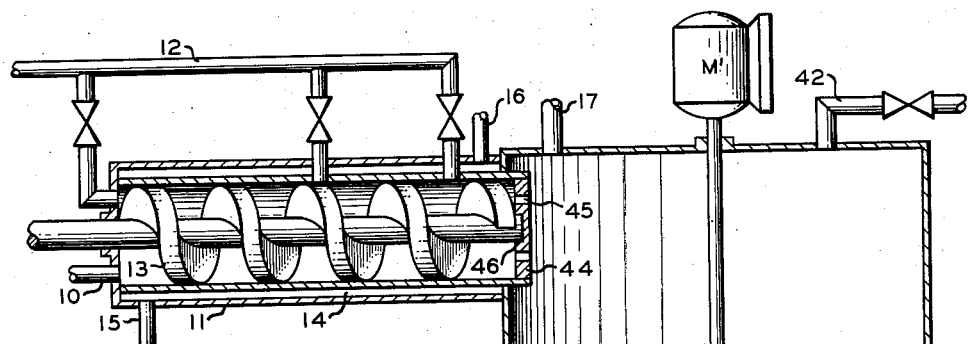
Figure 4 is a cross-sectional elevation of another modification of this invention.

An often preferred embodiment of the invention is shown in Figure 4, wherein reference numerals common to this and the preceding figures represent the same parts. In Figure 4, reactor 11 is, for example, welded into a wall of dissolution tank 40, which is provided with a stirrer 41, driven by motor M'; and with outlets 42 and 43. End member 44 is provided with dies or openings 45 and bearing 46. Conveyor 13 is shown as solid in this embodiment but can be hollow or hollow and perforate, as previously described.

In the embodiment shown in Figure 4, the reaction is conducted in reactor 11 substantially as described in connection with Figure 1, but the pasty reaction mixture is extruded from reactor 11, by conveyor 13, through openings or dies 45, into dissolution tank 40. Tank 40 is maintained substantially liquid-full of solution and maintained under turbulence with stirrer 41. The temperature in tank 40 is maintained at a sufficient value to effect solution of the polymer in the solvent, which is supplied hot through inlet 17. The temperature is generally higher than that in reactor 11 but usually not above 450° F. Solvent from jacket 14, preheated by heat of reaction, can be mixed with any needed solvent from another source, not shown, and heated to the desired temperature, by means not shown, prior to entry into tank 40, as discussed in connection with Figure 1.

Solution of polymer in solvent, together with catalyst suspended therein, is withdrawn from tank 40 through outlet 42 and/or 43, and passed to filtration means for catalyst removal, and polymer is recovered from the filtrate by precipitation and filtration or by vaporization of the solvent.

Tank 40 is a pressure vessel and can be provided with insulation, with a heating jacket, or with an immersion-type heater, not shown, as will be understood by those skilled in the art.

Figure 5:
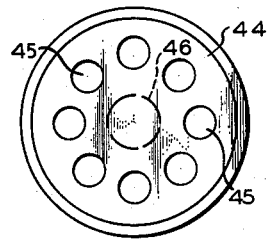
Figure 5 is an end view of the reactor end-closure member shown in Figure 4.

Figure 5 shows an end view of end member 44 of reactor 11.

Figure 6:
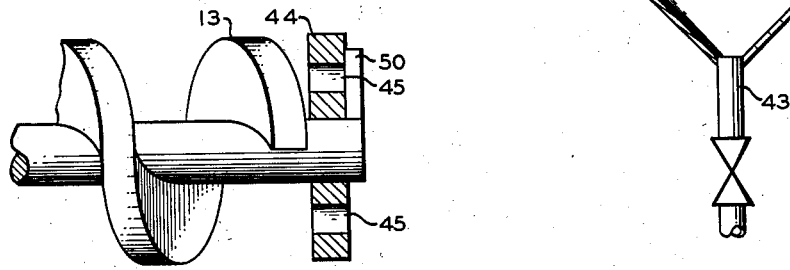
Figure 6 is a detail diagram of a modification of the apparatus of Figure 4.

Figure 6 shows a modification of the reactor of Figure 4. In Figure 6, the axle of conveyor 13 extends through end member 44 and is provided with cutter or knife blade 50 which revolves against end member 44 and cuts strings of polymer extruded through openings 45, thus facilitating polymer dissolution. This modification is especially valuable where polyethylene is produced and extruded, at a temperature near its melting point, through dies 45.

Figure 7:
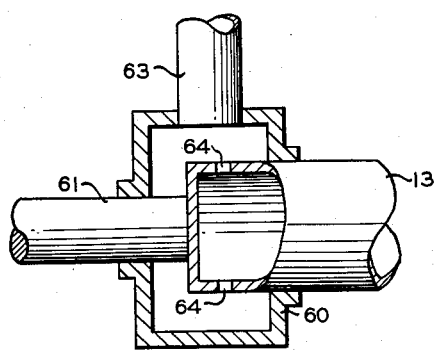
Figure 7 is a detail diagram of the coolant inlet chamber shown in Figures 1, 2, and 3.

Figure 7 shows a coolant injection chamber for use with the hollow helical conveyor. The device comprises fluid-tight chamber 60, solid motor shaft 61, coolant inlet 63, and openings 64 in the shaft or axle of hollow conveyor 13. Shaft 61 is rigidly attached to the shaft of conveyor 13. Shafts 61 and 13 are rotatably sealed in chamber 60 by means of suitable packing glands.

Coolant-solvent is supplied through inlet 63 to chamber 60 and passes through openings 64 into the interior of conveyor 13.

Suitable packing glands are also provided at other parts of the apparatus where a rotatable member extends through the walls of a stationary container.

While the flow of coolant and reactants through chamber 11 have been shown as concurrent for purposes of simplicity, countercurrent flow is within the scope of the invention and is often preferred. Also, although the polymerization is exothermic, it is in some cases desirable to use jacket 14 as a heating jacket, in which case means to heat the fluid entering jacket 14 can readily be provided by those skilled in the art.

Example I

Ethylene was polymerized at 300 to 325° F. and 450 p.s.i. by contacting solutions of ethylene in isooctane (2,2,4-trimethylpentane) with a fixed bed of catalyst comprising chromium oxide, of which an appreciable portion of the chromium was hexavalent, supported on a coprecipitated 90 weight percent silica-10 weight percent alumina gel composite. The total chromium content of the catalyst was 2.5 weight percent. The catalyst was prepared by impregnating the silica-alumina composite with aqueous chromium trioxide, igniting, and activating in dry air at about 950° F. The following data were obtained:

| Run | 1 | 2 |
|---|---|---|
| Ethylene in feed soln., wt. percent | 2.0 | 9.9 |
| Liquid hourly space velocity | 5.9 | 13.7 |
| Duration, hr | 5.0 | 1.2 |
| Average conversion, percent | 98 | 41 |
| Yield, wt. percent $C_2H_4$ converted: | | |
|   Solid polymer (in effluent) | 82 | 58 |
|   Semi-solid polymer | 3 | 6 |
|   Insoluble polymer on catalyst | 15 | 36 |
| Mol. wt. solid polymer (in effluent) | 15,750 | 25,820 |
| Catalyst spalling | No | Yes |

From the above data, it will be noted that the higher ethylene concentration in the feed resulted in a higher yield of heavier polymer, but much of this deposits on the catalyst, necessitating intermittent extraction to recover the polymer deposited. The lower average conversion can be compensated for by recycling the unconverted ethylene.

Example II

In a run conducted according to this invention in a 4-inch diameter reactor provided with a solid helical conveyer, 400 ml. (277 gm.) of isooctane and 2.5 grams of 20–30 mesh catalyst having the composition set forth in Example I are charged to the reactor. The conveyor is rotated at 200 r.p.m., and ethylene is charged to maintain a maximum pressure of 300 p.s.i. The reaction is continued at 270° F. for 10 hours. The polyethylene yield is 177 grams. The reaction mixture has a polymer concentration of 39 weight percent. This mixture is too viscous at reaction temperature to stir efficiently by ordinary methods. However, in the reactor of this invention, mixing and temperature control are readily effected, cooling being obtained by indirect heat exchange with isooctane circulated through a jacket encompassing the reactor.

The reaction mixture is diluted to 3 weight percent polymer by addition of a further amount of isooctane, which was previously used as coolant and thus preheated, and the polymer is dissolved by agitation at 300° F. The catalyst is filtered off and the polymer is recovered by cooling the filtrate to room temperature and filtering. The recovery is 95 percent. The recovered polyethylene has a molecular weight of about 50,000 and is tough and flexible. It can be extruded to form tubing or pipe and can be molded to form cups or bottles.

According to this invention, the relative amounts of olefin and solvent in the reactor are preferably controlled to obtain a polymer concentration of at least 10 weight percent in the effluent. When the reaction temperature is above the melting point of the polymer (usually from 240 to 260° F. in the case of polyethylene), the polymer concentration in the reactor effluent is preferably maintained at from 10 to 40 weight percent. When the reaction temperature is below the melting point of the polymer, the polymer concentration in the effluent is from 25 to 50 weight percent. The polymer concentration is directly proportional to the ratio of ethylene to solvent charged to the reactor.

To summarize, I have provided, as my invention, a process wherein an olefin is converted to normally solid polymer by reacting said olefin under polymerization conditions of temperature and pressure in a reaction mixture which contains sufficient polymer to render the mixture pasty or plastic, and an apparatus comprising a reaction chamber in communication with a polymer dissolution chamber, means for forcing a plastic material through said reaction chamber into said dissolution chamber, a coolant chamber in indirect heat exchange relation with said reaction chamber and in communication with said dissolution chamber, inlet means for said reaction chamber and for said coolant chamber, and outlet means for said coolant chamber. Variation and modification are possible within the scope of the invention. Although certain structures, examples, and process steps have been described for purposes of illustration, the invention clearly is not limited thereto.

I claim:

1. A reactor comprising, in combination: an elongated reaction chamber being jacketed by a cooling chamber, conveying and kneading means positioned within said reaction chamber; means for driving said conveying and kneading means; outlet means for said chambers; fluid inlet means for said chambers; a dissolution chamber in communication with said reaction chamber; and conduit means establishing communication between said cooling chamber and said dissolution chamber.

2. A polymer production apparatus, comprising in combination: an elongated reaction chamber in open communication with a polymer dissolution chamber through at least one polymer extrusion conduit; a coolant chamber positioned in indirect heat exchange relation with said reaction chamber and in communication with said dissolution chamber; means for supplying fluid to said reaction chamber; means for supplying coolant to said coolant chamber; and means for moving pasty material through said reaction chamber and said extrusion conduit into said dissolution chamber.

3. Polymer production apparatus comprising, in combination: an elongated reaction chamber in open communication with a polymer dissolution chamber through a plurality of polymer extrusion openings in an end-closure plate in said reaction chamber; a helical conveyor mounted on a shaft which is rotatably positioned axially in said reaction chamber and extends through said plate; cutting means mounted on said shaft within said dissolution chamber and adapted to sever material extruded through said openings; a coolant chamber in indirect heat exchange relation with said reaction chamber and in communication with said dissolution chamber; means for supplying a slurry to said reaction chamber; means for supplying fluid to said reaction chamber; means for supplying fluid to said coolant chamber; means for rotating said conveyor; means for heating fluid supplied to said dissolution chamber; and agitation means positioned in said dissolution chamber.

4. Polymer production apparatus comprising, in combination: an elongated reaction chamber in open communication with a polymer dissolution chamber through a plurality of polymer extrusion openings in an end-closure plate in said reaction chamber; a hollow helical conveyor mounted on a shaft which is rotatably positioned axially in said reaction chamber and extends through said plate; means for circulating coolant through the interior of said hollow helical conveyor; a coolant chamber in indirect heat exchange relation with said chamber and in communication with said dissolution chamber; means for supplying a slurry to said reaction chamber; means for supplying fluid to said reaction chamber; means for supplying fluid to said coolant chamber; means for rotating said conveyor; means for heating fluid supplied to said dissolution chamber; and agitation means positioned in said dissolution chamber.

5. Apparatus according to claim 4 wherein said shaft of said hollow helical conveyor is hollow and said means for circulating coolant through the interior of said conveyor includes a coolant introduction chamber sealingly encompassing part of said shaft; conduit means establishing communication between the interior of said last-mentioned chamber and the interior of said shaft; and means for introducing fluid into said last-mentioned chamber.

6. Polymer production apparatus comprising, in combination: an elongated reaction chamber in open communication with a polymer dissolution chamber through a plurality of polymer extrusion openings in an end-closure plate in said reaction chamber; a hollow helical conveyor mounted on a shaft which is rotatably positioned axially in said reaction chamber and extends through said plate; means for introducing fluid into the interior of said hollow helical conveyor; conduit means establishing communication between the interior of said conveyor and the interior of said polymer dissolution chamber; a coolant chamber in indirect heat exchange relation with said reaction chamber and in communication with said dissolution chamber; means for supplying a slurry to said reaction chamber; means for supplying fluid to said reaction chamber; means for supplying fluid to said coolant chamber; means for rotating said conveyor; means for heating fluid supplied to said dissolution chamber; and agitation means positioned in said dissolution chamber.

References Cited in the file of this patent

UNITED STATES PATENTS

| | | |
|---|---|---|
| 2,395,079 | Sparks et al. | Feb. 19, 1946 |
| 2,494,588 | Skooglund | Jan. 17, 1950 |
| 2,612,465 | Kiersted et al. | Sept. 30, 1952 |
| 2,617,273 | Findlay | Nov. 11, 1952 |
| 2,700,663 | Peters | Jan. 25, 1955 |
| 2,735,843 | Weedman | Feb. 21, 1956 |

FOREIGN PATENTS

| | | |
|---|---|---|
| 530,617 | Belgium | Jan. 24, 1955 |